(12) United States Patent
Garnier et al.

(10) Patent No.: US 8,804,954 B2
(45) Date of Patent: Aug. 12, 2014

(54) SECURE METHOD FOR RECONSTRUCTING A REFERENCE MEASUREMENT OF A CONFIDENTIAL DATUM ON THE BASIS OF A NOISY MEASUREMENT OF THIS DATUM, NOTABLY FOR THE GENERATION OF CRYPTOGRAPHIC KEYS

(75) Inventors: Steven Garnier, Longvic (FR); Sandra Marcello, Paris (FR)

(73) Assignee: Thales, Neuilly sur Seine (FR)

( * ) Notice: Subject to any disclaimer, the term of this patent is extended or adjusted under 35 U.S.C. 154(b) by 788 days.

(21) Appl. No.: 12/845,192

(22) Filed: Jul. 28, 2010

(65) Prior Publication Data
US 2011/0047419 A1 Feb. 24, 2011

(30) Foreign Application Priority Data
Jul. 28, 2009 (FR) ..................... 09 03699

(51) Int. Cl.
| G06F 15/16 | (2006.01) |
| G06K 9/00 | (2006.01) |
| H04L 9/32 | (2006.01) |
| G06F 21/34 | (2013.01) |
| H04L 9/08 | (2006.01) |
| G06F 21/32 | (2013.01) |
| H03M 13/13 | (2006.01) |

(52) U.S. Cl.
CPC .............. *G06K 9/00* (2013.01); *H03M 13/13* (2013.01); *H04L 9/3231* (2013.01); *G06F 21/34* (2013.01); *H04L 9/0866* (2013.01); *H04L 2209/805* (2013.01); *G06F 21/32* (2013.01); *H04L 9/3278* (2013.01); *H04L 2209/34* (2013.01)
USPC ............... 380/44; 380/54; 713/150; 713/168; 713/186; 709/246

(58) Field of Classification Search
USPC ........ 380/44, 54; 713/150, 168, 186; 709/246
See application file for complete search history.

(56) References Cited

U.S. PATENT DOCUMENTS 5,673,320 A * 9/1997 Ray et al. ....................... 713/176
8,347,106 B2 * 1/2013 Tsuria et al. ................... 713/186
(Continued)

FOREIGN PATENT DOCUMENTS

WO WO2009-024913 * 12/1899
WO 2009/024913 A2 2/2009

OTHER PUBLICATIONS

Hao et al., "Combining cryptography with biometrics effectively"; Technical Report at the University of Cambridge—Computer Laboratory, Jul. 1, 2005, pp. 1-17, vol. 28, No. 640, XP0009072846.*

(Continued)

*Primary Examiner* — Krista Zele
*Assistant Examiner* — Anthony Fabbri
(74) *Attorney, Agent, or Firm* — Baker & Hostetler LLP (57) ABSTRACT

The present invention relates to a secure method for reconstructing a reference measurement of a confidential datum on the basis of a noisy measurement of this datum. The method proposes a phase of enrolling a reference datum w having n digits, comprising at least the following steps:
  selecting an error correcting code C of a length L greater than n;
  generating an extended datum $w_e$ by increasing the size of the reference datum w with L-n digits making up a key $S_k$;
  choosing a word c of the selected error correcting code C;
  generating the reconstruction datum s by combining the said word c with the said extended datum $w_e$.

The invention applies notably to the authentication of individuals and to the generation of cryptographic keys, using for example biometric data or the physical characteristics intrinsic to an electronic component.

9 Claims, 6 Drawing Sheets

(56) References Cited

U.S. PATENT DOCUMENTS

| | | | |
|---|---|---|---|
| 2003/0204743 A1 | 10/2003 | Devadas et al. | |
| 2006/0210082 A1 | 9/2006 | Devadas et al. | |
| 2007/0253592 A1* | 11/2007 | Sun et al. | 382/100 |
| 2007/0291611 A1* | 12/2007 | Eckleder et al. | 369/53.31 |
| 2008/0235772 A1* | 9/2008 | Janzen | 726/5 |
| 2009/0049502 A1* | 2/2009 | Levien et al. | 725/136 |
| 2009/0083833 A1 | 3/2009 | Ziola et al. | |

OTHER PUBLICATIONS

Hao, Feng et al., "Combining Cyrptography with Biometrics Effectively", Technical Report at the University of Cambridge—Computer Laboratory, Jul. 1, 2005, pp. 1-17, vol. 28, No. 640, XP0009072846.

Dodis, Yevgeniy et al., "Fuzzy Extractors: How to Generate Strong Keys from Biometrics and Other Noisy Data", Internet Citation—URL:http://www.cs.bu.edu/~reyzin/papers/fuzzy.pdf, Jan. 20, 2008, XP 007905694.

Ari Juels et al., "A Fuzzy Commitment Scheme, 6th ACM Conference on Computer and Communications Security", Singapore, Nov. 2-4, 1999, pp. 28-36, ACM, US, New York, NY, XP002285060.

A. Menezes, et al., "Handbook of Applied Cryptography", 1996, pp. 192, 334-335, CRC Press, via internet—www.cacr.math.uwaterloo.ca/hac, XP 002567889.

* cited by examiner

SECURE METHOD FOR RECONSTRUCTING A REFERENCE MEASUREMENT OF A CONFIDENTIAL DATUM ON THE BASIS OF A NOISY MEASUREMENT OF THIS DATUM, NOTABLY FOR THE GENERATION OF CRYPTOGRAPHIC KEYS

CROSS-REFERENCE TO RELATED APPLICATIONS

This application claims priority to foreign France patent application No. 0903699, filed on Jul. 28, 2009, the disclosure of which is hereby incorporated by reference in its entirety.

FIELD OF THE INVENTION

The present invention relates to a secure method for reconstructing a reference measurement of a confidential datum on the basis of a noisy measurement of this datum. It applies notably to the authentication of individuals and to the generation of cryptographic keys, using for example biometric data or the physical characteristics intrinsic to an electronic component.

BACKGROUND OF THE INVENTION

Applications calling upon cryptography generally require the storage of a key in an apparatus, for example an electronic apparatus. However, although it is recommended that cryptographic keys of increasingly large size be employed to guarantee the security of information systems, certain apparatuses have only a small memory space for recording a key. By way of illustration, it is commonly recommended that a cryptographic key of at least 2048 bits be employed for the public-key RSA ("Rivest Shamir Adleman") algorithm, widely used today in electronic commerce. Moreover, when the key to be used is secret, its storage can constitute a security flaw when faced with an attacker.

Hence, to avoid storing a cryptographic key in an electronic apparatus, it has been proposed that a key be generated with the aid of biometric data such as, for example, a fingerprint. Recently, it has been proposed in the article "efficient helper data key extractor on FPGa's" C. Bösch, J. Guajardo, A-R. Sadeghi; J. Shokrollahi and P. Tuyls; CHES 2008; LNCS 5154; p184-197, that a cryptographic key be generated on the basis of a function related to the physical characteristics specific to an electronic component, this type of function commonly being designated by the acronym PUF for "Physical Unclonable Function" signifying "physically non-reproducible function". However, whether the data arise from biometric measurements or whether they arise from a PUF of an electronic component, these data are noisy. Indeed, for several executions of one and the same processing systematically taking the same reference datum as input, the physical measurements output by this processing are not strictly identical, although closely related. A practical illustration of this principle is a fingerprint sensor which, for a given finger, does not systematically output the same characterization of this finger, on account of the variations of positioning of the finger on the sensor, of its moisture, of its temperature and of other uncontrolled physical parameters. Consequently, these physical measurements may not be used directly as a cryptographic key, since information encrypted with a first measurement datum arising from a first occurrence of a processing of the reference datum could not be decrypted with a second measurement datum arising from a second occurrence of this same processing.

Moreover, the measured data are not, a priori, uniformly distributed. Stated otherwise, even in the absence of noise, the measurement could not constitute a safe cryptographic key.

These two problems, namely the non-uniform character of the measured data and the presence of noise—therefore the instability of these data—have been dealt with by Dodis et al in the article entitled "Fuzzy Extractors: How to generate strong keys from biometrics and other noisy data" presented at EUROCRYPT 2004: LNCS, vol. 3027, pages 523-540 Springer (latest version SIAM J. Comput., vol 38 issue 1 p 97-139, 2008). To render the data stable despite the presence of noise, the authors of this article propose the use of a fuzzy extractor. One possibility for constructing a fuzzy extractor is the use of two primitives. A first module, designated by the expression "secure sketch", allows the conciliation of the information, that is to say the restoral of a systematically identical value at output for one and the same input datum, and a second module makes it possible to render the output of the fuzzy extractor uniform by applying a randomness extraction function to the said output, previously stabilized. The fuzzy extractor operates in two phases: enrolment and correction. These two phases are found in the "secure sketch" module: enrolment and correction. The enrolment phase can be executed only once; it produces, on the basis of a reference datum, denoted w, arising from a measurement of a confidential datum denoted W provided as input, a public datum, denoted s and sometimes dubbed a "sketch". Conventionally, the reference datum w may be obtained via a first measurement arising from a processing of a confidential datum W received by a sensor or an electronic component. By way of illustration, the confidential datum W is a fingerprint and the reference datum w is the characteristic datum obtained by a first measurement of this print by a sensor. Only the public datum s is recorded, the reference datum w being confidential. Subsequently, the correction phase is executed each time that one wishes to retrieve the reference datum w. To this end, a noisy datum w' originating from a measurement arising from a processing of the confidential datum W—for example, a second measurement of the same fingerprint—is combined with the public datum s. The public datum s therefore plays a role of reconstruction of the confidential reference measurement w on the basis of a noisy datum w'. If the noisy datum w' is too far from the reference datum w, this reference datum w cannot be reconstructed. Such is the case, for example, when the noisy datum w' is obtained by a measurement of a processing of a different datum X from the confidential datum W.

More precisely, the reconstruction of the reference datum w involves the use of an error correcting code. During the enrolment phase, a correcting code is selected, and then a word, denoted c, of this code is chosen randomly. The reference datum w is thereafter combined with the word c to produce the public datum s. Thereafter, during the correction phase, this public datum s is combined with the noisy datum w' to produce a word denoted c', which does not necessarily belong to the selected code. The word c' is subjected to the correcting code decoding function. The word c' is then restored as code word c on condition that the datum w' is sufficiently close to the reference datum w. To reconstruct the reference datum w, it thereafter suffices to combine the code word c thus retrieved with the public datum s. However, this solution has limits, as explained later.

Recall that an error correcting code may be characterized by three parameters, namely respectively the length "n" of the code, the dimension "k" of the code, and the minimum distance "d" between two words of the code, which distance is proportional to the correction capacity t of the code, that is to say to the number of errors that the code is capable of correcting in a word. The noise level undergone by the datum w' therefore imposes the value of the minimum distance "d", the distance used generally being the Hamming distance (for fingerprints it is not possible to use the Hamming distance).

The security level of the system increases proportionately to $b^k$, b being the number base in which the words of the datum are expressed. Indeed, to discover the input datum w by brute force, an attacker ought to find, from among the $b^k$ possible code words of length n, that one corresponding to the word of the code chosen to code the reference datum w. Hence, it is preferable to select a correcting code, the value of whose parameter k is as high as possible.

In parallel, the length n of the code chosen to code the datum is bounded by the length of the reference datum w. Starting from the known upper bound relation (bound of the singleton) n−k≥d−1, it follows that the dimension k of the code is also bounded above by n−d+1 and therefore bounded above by the value equal to length(w)−d+1.

Having regard to these two conflicting constraints exerted on the parameter k, it becomes difficult, or indeed impossible, to find a correcting code which allows the input datum to be reconstructed on the basis of a noisy datum while guaranteeing a good level of protection of this input datum, a fortiori when the value of d must be high on account of a high noise level. Sometimes, even when a correcting code meets all these requirements, its execution is inconceivable on an electronic component since it is too complex.

SUMMARY OF THE INVENTION

The invention produces a cryptographic key in a secure manner on the basis of a PUF of an electronic component or of a biometric datum. For this purpose, the subject of the invention is a method for enrolling a reference datum w having n digits, executed by a calculation unit, the said method comprising at least the following steps:
  selecting an error correcting code C of a length L greater than n, the correction capacity of the error correcting code being greater than the expected number of errors between two acquisitions of the reference datum w, the correcting code having a predetermined minimum dimension corresponding to a minimum security level;
  generating an extended datum $w_e$ by increasing the size of the reference datum w with L−n digits making up a secret key $S_k$;
  randomly choosing a word c of the selected error correcting code C;
  combining the said word c with the said extended datum $w_e$, so as to generate a datum s for reconstructing $w_e$;
  recording the datum s on a storage medium.

According to a favoured mode of implementation of the enrolment method according to the invention, the data are binary data, and the combination of the word c with the extended datum $w_e$ is performed by "exclusive or".

The key $S_k$ may be defined by a pair of lists (V, P), the first list V comprising L−n digits to be inserted into the reference datum w, the second list P comprising for each of the said digits to be inserted its position in the said datum. For example, several portions of the key may be stored on different memory media.

The subject of the invention is also a data correction method executed by a calculation unit for reconstructing an extended reference datum $w_e$ having L digits on the basis of a noisy datum w' having n digits, n≤L, and of a reconstruction datum s generated during the enrolment of the reference datum w with the enrolment method described above, the said correction method comprising at least the following steps:

generating an extended noisy datum $w_e'$ by increasing the size of the noisy datum w' with L−n digits making up the said key $S_k$;
  combining the reconstruction datum s with the extended noisy datum $w_e'$ to obtain a word c' of length L;
  decoding the word c' as word c" belonging to the code C;
  combining the word c" with the reconstruction datum s to generate a stabilized datum $w_s$ equal to the extended reference datum $w_e$ if the word c" obtained by decoding is identical to the word c.

Once the extended reference datum $w_e$ has been reconstructed, it suffices to remove from this datum $w_e$ the digits inserted during the enrolment phase so as to restore, if so desired, the initial reference datum w. For an equivalent noise level, the correction method according to the invention makes it possible to reconstruct the reference datum with a higher level of security than with a conventional method. As a corollary, for an equivalent security level, the method according to the invention makes it possible to increase the data correction capacity and therefore its ability to stabilize them. It sets out notably to generalize the conventional methods, since it encompasses the cases where L=n.

The noisy datum w' may be provided by a function related to the physical characteristics specific to an electronic circuit, that is to say by a PUF. The electronic circuit may be integrated into a component or be embodied on an electronic card, for example.

According to another implementation of the method according to the invention, the noisy datum w' is provided by a biometric sensor, which sensor for example makes it possible to measure the characteristics of a fingerprint, of the iris of an eye or of the voice of an individual.

The subject of the invention is also a secure method for stabilizing data comprising a step of determining the minimum correction capacity of the error correcting code C to be employed to stabilize the said data as a function of the level of noise by which they are affected, a step of selecting the said error correcting code C from among several available codes, the said selected code C being able to have a length greater than the length n of the said data, a test being performed to determine whether the said selected code C has a length greater than n, the method comprising a step of creating a key $S_k$ in the case where the said selected code C has a length greater than n, at least one enrolment method such as described above, followed by a correction method such as described above being executed to generate a stabilized datum.

Advantageously, the error correcting code C is the code of minimum length simultaneously satisfying a correction capacity criterion as regards the noise affecting the noisy datum w' and a desired security level.

The subject of the invention is also a method for authenticating and/or generating a cryptographic key comprising a randomness extraction step applied to the stabilized datum $w_s$ generated by the secure method for stabilizing data such as described above. The application, for example, of a hash function to the stabilized output $w_s$ makes it possible to generate a uniformly distributed cryptographic key.

According to an implementation of the enrolment method according to the invention, a hash function H is applied to a combination of the extended reference datum $w_e$ with the reconstruction datum s, to form a check hashed datum h. The enrolment method according to the invention can thus be combined with the robust "secure sketch" principle, as explained further on.

The subject of the invention is also a data correction method executed by a calculation unit for reconstructing an extended reference datum $w_e$ having L digits on the basis of a noisy datum w' having n digits, n≤L, and of a reconstruction datum s generated during the enrolment of the reference datum w with the method comprising the application of a hash function H, the said correction method comprising at least the following steps:

generating an extended noisy datum $w_e'$ by increasing the size of the noisy datum w' with L-n digits making up the said key $S_k$;

combining the reconstruction datum s with the extended noisy datum $w_e'$ to obtain a word c' of length L;

decoding the word c' as word c" belonging to the code C;

combining the word c" with the reconstruction datum s to generate a stabilized datum $w_s$;

applying the hash function H to a combination of the stabilized datum with the reconstruction datum s to produce a hashed datum $h_s$;

comparing the check hashed datum h, obtained during the enrolment, with the hashed datum $h_s$;

producing a value ⊥ indicating an error if the data h and $h_s$ are different.

The subject of the invention is also an electronic authentication system comprising a biometric sensor, said system comprising a recording medium storing a secret key $S_k$, a calculation unit implementing the authentication method such as described above, the said calculation unit being able to receive the secret key $S_k$ arising from the said medium and a noisy datum w' arising from the said sensor.

The method according to the invention makes it possible to reconstruct a reference datum w on the basis of a noisy measurement w' of this datum w while preserving the inaccessibility to this datum w if the noisy measurement w' is not performed on the said reference datum w.

BRIEF DESCRIPTION OF THE DRAWINGS

Other characteristics will become apparent on reading the detailed description given by way of nonlimiting example which follows offered in relation to appended drawings which represent:

FIGS. 1a', 1b' and 1c', schematics illustrating the principle of the reproduction function for a fuzzy extractor making it possible to reproduce a cryptographic key with a method according to the invention;

DETAILED DESCRIPTION

For the sake of clarity, identical references in different figures designate the same elements.

Figure 1A:
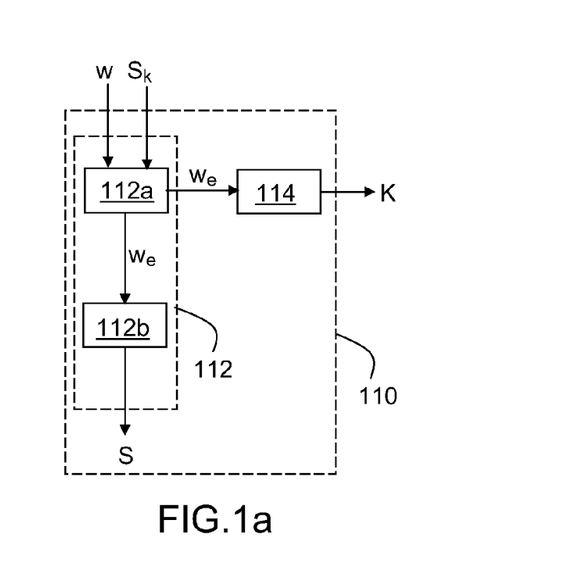
FIGS. 1a, 1b and 1c, schematics illustrating the principle of the generation function for a fuzzy extractor making it possible to generate a cryptographic key with a method according to the invention.

FIG. 1a presents a schematic which illustrates the principle of the generation function for a fuzzy extractor making it possible to generate a cryptographic key with a method according to the invention. The fuzzy extractor 110 comprises a data enrolment module 112 and a standard randomness extractor 114. The data enrolment module 112 makes it possible to produce a reconstruction datum s on the basis of a reference datum w; it comprises an expansion module 112a and a conventional "secure sketch" module 112b. The reference datum w is received by the fuzzy extractor 110 in digitized form, for example in the form of a series of n bits.

The expansion module 112a is able to receive as input the reference datum w and a key $S_k$ that is preferably secret, and to produce as output an extended reference datum $w_e$ whose length is greater than that of the reference datum w. The extended reference datum $w_e$ is provided to the randomness extractor 114, which outputs the cryptographic key K. The conventional "secure sketch" module 112b is able to receive as input the extended reference datum $w_e$ and is able to produce as output a reconstruction public datum s of the same length as that of the extended datum $w_e$.

Figure 1B:
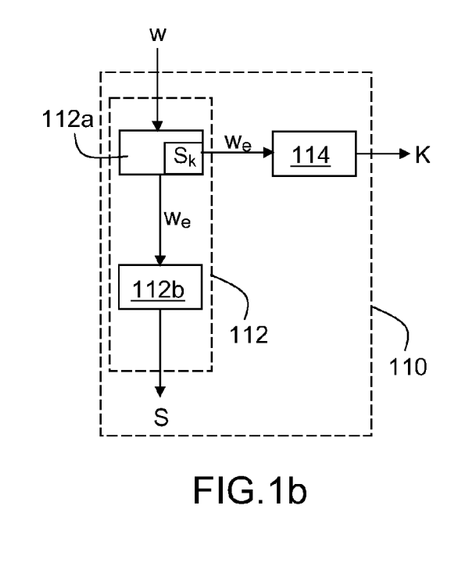

FIG. 1b presents a variant of the embodiment of FIG. 1a'. According to the embodiment of FIG. 1b', the secret key $S_k$ is stored within the fuzzy extractor, in the example, within the expansion module 112a. According to this embodiment, this secret key $S_k$ is therefore not provided as input to the data enrolment module 112.

Figure 1C:
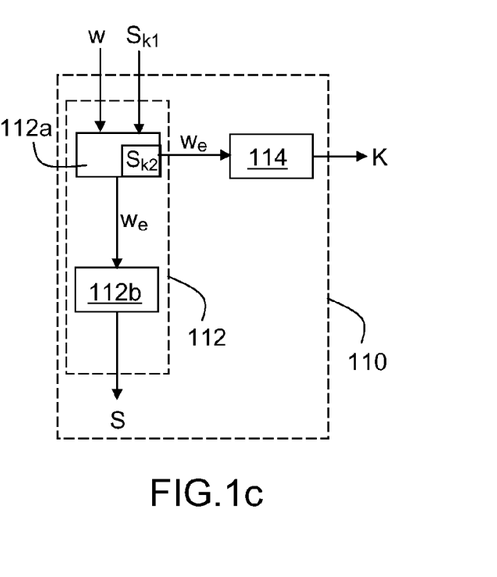

FIG. 1c presents a hybrid variant of the embodiment of FIG. 1a and of FIG. 1b. According to the embodiment of FIG. 1c, one part $S_{k2}$ of the secret key $S_k$ is stored within the fuzzy extractor, in the example, within the expansion module 112a, and another part $S_{k1}$ of the secret key is provided as input to the data enrolment module 112.

FIG. 1a' presents a schematic illustrating the principle of the reproduction function for a fuzzy extractor making it possible to reproduce a cryptographic key with a method according to the invention. The fuzzy extractor 110 comprises a data stabilization module 112' and a standard randomness extractor 114. The data stabilization module 112' makes it possible to systematically provide the same datum as output for input data close to a reference datum; it comprises an expansion module 112a' and a conventional "secure sketch" module 112b'. The reproduction function for the fuzzy extractor 110 makes it possible to reproduce a cryptographic key K on the basis of a noisy datum w', for example arising from a PUF of an electronic component. The noisy datum w' is received by the fuzzy extractor 110 in digitized form, for example in the form of a series of n bits.

The expansion module 112a' is able to receive as input the noisy datum w' and an identical key $S_k$ to that used for the enrolment phase, and to produce as output an extended noisy datum $w_e'$ whose length is greater than that of the noisy datum w'. The conventional "secure sketch" module 112b' is able to receive as input an extended noisy datum $w_e'$ and is able to produce as output a stabilized datum $w_e$ of the same length as that of the extended datum $w_e$. Finally, the stabilized datum $w_e$ is provided to the randomness extractor 114, which outputs the cryptographic key K.

FIG. 1b' presents a variant of the embodiment of FIG. 1a'. According to the embodiment of FIG. 1b', the secret key $S_k$ is stored within the fuzzy extractor, in the example, within the expansion module 112a'. According to this embodiment, this secret key $S_k$ is therefore not provided as input to the data stabilization module 112'.

FIG. 1c' presents a hybrid variant of the embodiment of FIG. 1a' and of FIG. 1b'. According to the embodiment of FIG. 1c', one part $S_{k2}$ of the secret key $S_k$ is stored within the fuzzy extractor, in the example, within the expansion module 112a', and another part $S_{k1}$ of the secret key is provided as input to the data stabilization module 112'.

The fuzzy extractor 110 may be implemented by a calculation unit, for example a microprocessor coupled to a memory containing the instructions required for its execution or a programmable circuit, for example of FPGA ("Field-Programmable Gate Array") type.

Figure 2A:
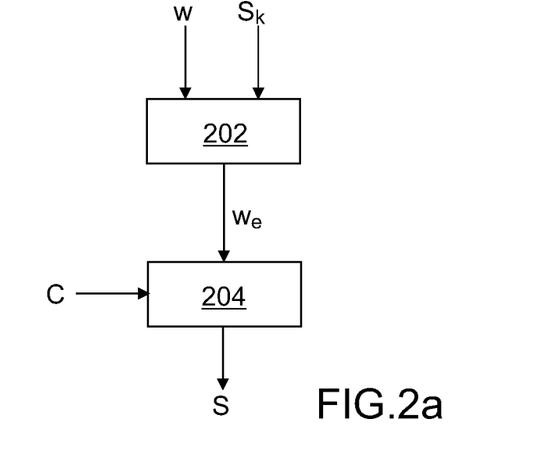
FIG. 2a, a schematic illustrating the steps of a phase of enrolment of a first implementation of the method according to the invention.

FIG. 2a is a schematic illustrating the steps of an enrolment phase implementing the method according to the invention. The enrolment phase makes it possible to generate a public datum s allowing a person possessing a noisy measurement of this confidential datum to reconstruct the said confidential datum.

A secret key $S_k$ is created, for example, by including two lists V and P. The first list $V=\{v_1, v_2, \ldots, v_{L-n}\}$ defines L-n values to be inserted into the reference datum w so as to increase its size and the second list $P=\{p_1, p_2, \ldots, P_{L-n}\}$ defines, for each of the values of the list V, the position at which this value must be inserted. This example is nonlimiting, but this mode of definition of the secret key $S_k$ comprises notably the advantage of being able to store the two lists V and P separately so as to increase the level of security of the method. Returning to the example of the reproduction function for the fuzzy extractor 110, illustrated in FIG. 1c', the first list V may be stored within the said fuzzy extractor (part of the key referenced $S_{k2}$) while the second list P may be stored on a separate device, for example an external mass medium such as a USB key, and be provided as input to the system 100 (part of the key referenced $S_{k1}$) when access to this key is requested.

The L-n values of the list V are inserted 202 into the reference datum w (of size n), so as to obtain an extended datum $w_e$ of length L. Thereafter, a conventional "secure sketch" function 204 is executed on the extended datum $w_e$ to produce the public datum s of size L: a code word c is chosen randomly in the correcting code C and the extended datum $w_e$ is combined with the code word c.

An example of "secure sketch" is the so-called "code-offset" construction described subsequently. The operation $s=w_e \oplus c$ is performed, the symbol "$\oplus$" designating the "exclusive or" operator, the operands $w_e$ and c being considered, in the example, to be binary data. The datum s is a non-sensitive public datum, and is therefore stored, for example, in the electronic apparatus executing the fuzzy extractor.

Figure 2B:
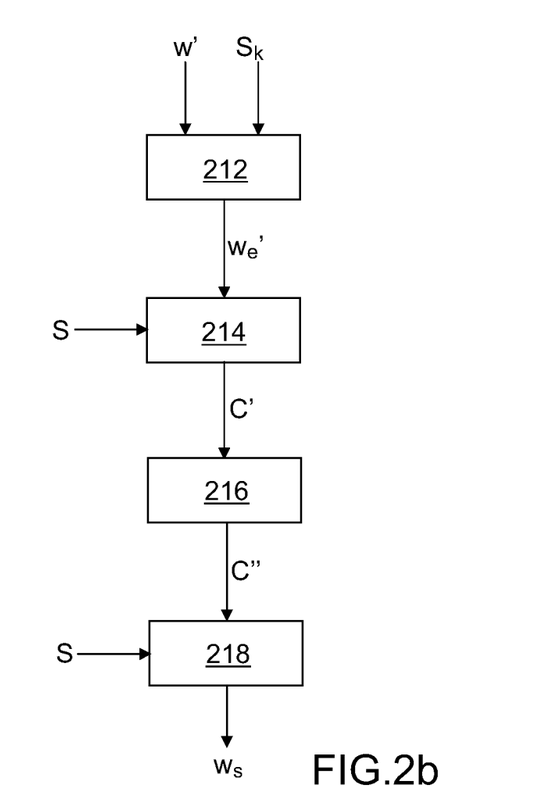
FIG. 2b, a schematic illustrating the steps of a phase of correction of the first implementation of the method according to the invention.

FIG. 2b is a schematic illustrating the steps of a correction phase with a first implementation of the method according to the invention. The correction phase makes it possible, on the basis of a noisy measurement w' of a confidential datum and of the reconstruction public datum s generated during the enrolment phase, to reconstruct the said confidential datum.

Initially, the noisy datum w' to be processed is modified in a manner analogous to that in which the reference datum w was modified during the enrolment phase, by using the secret key $S_k$. In the example, the values of the list V are inserted 212 into the noisy datum w' at the positions specified by the list P. An extended noisy datum $w_e'$ of size L is thus obtained and a conventional "secure sketch" decoding function may be applied to the extended noisy datum $w_e'$.

In the example, a word c' of size L is determined 214 as follows: $c'=w_e' \oplus s$. Next, the decoding function 216 for the correcting code C is used to retrieve the code word c chosen during the enrolment phase: $c''=Decode_c(c')$. The code word c is not retrieved if the word c' is too far from it in the sense of the Hamming distance, stated otherwise if the extended noisy datum $w_e'$ was too far from the extended reference datum $w_e$. Put otherwise, the word c" arising from the decoding 216 belongs to the selected correcting code C but is not identical to the word c initially chosen during the enrolment phase. Finally, in the converse case where the code word c has been retrieved, the extended datum $w_e$ is restored with the following operation 218: $w_s=s \oplus c$, $w_s$ being a stabilized datum equal to $w_e$. In the case where the word c" arising from the decoding is not the same as the initial word c, the operation 218 of combining with the reconstruction datum s produces a different datum $w_s$ from the extended datum $w_e$.

The method according to the invention therefore makes it possible to lengthen the noisy datum w' without increasing the noise undergone by the said datum, since the values of V inserted into the noisy datum w' are identical and at the same positions in the enrolment phase and in the correction phase. Hence, the value of the parameter d may be left unchanged while the maximum value attainable by the parameter k of the error correcting code, equal to length($w_e$)−d+1, (that is to say equal to L−d+1) is increased by the value L-n. Consequently, the set of correcting codes which at one and the same time meet the noise correction and security requirements is widened.

Furthermore, the secret key $S_k$ is much shorter in size than the cryptographic key to be produced, thereby rendering it recordable in an electronic apparatus with low storage capacity. For a binary datum, a secret key $S_k$ defined by a pair of lists (V, P) mobilizes L-n bits for the storage of the bits of values of the first list V and fewer than (L-n)*$\log_2(n)$ bits for the storage of the insertion positions belonging to the second list P.

Figure 3:
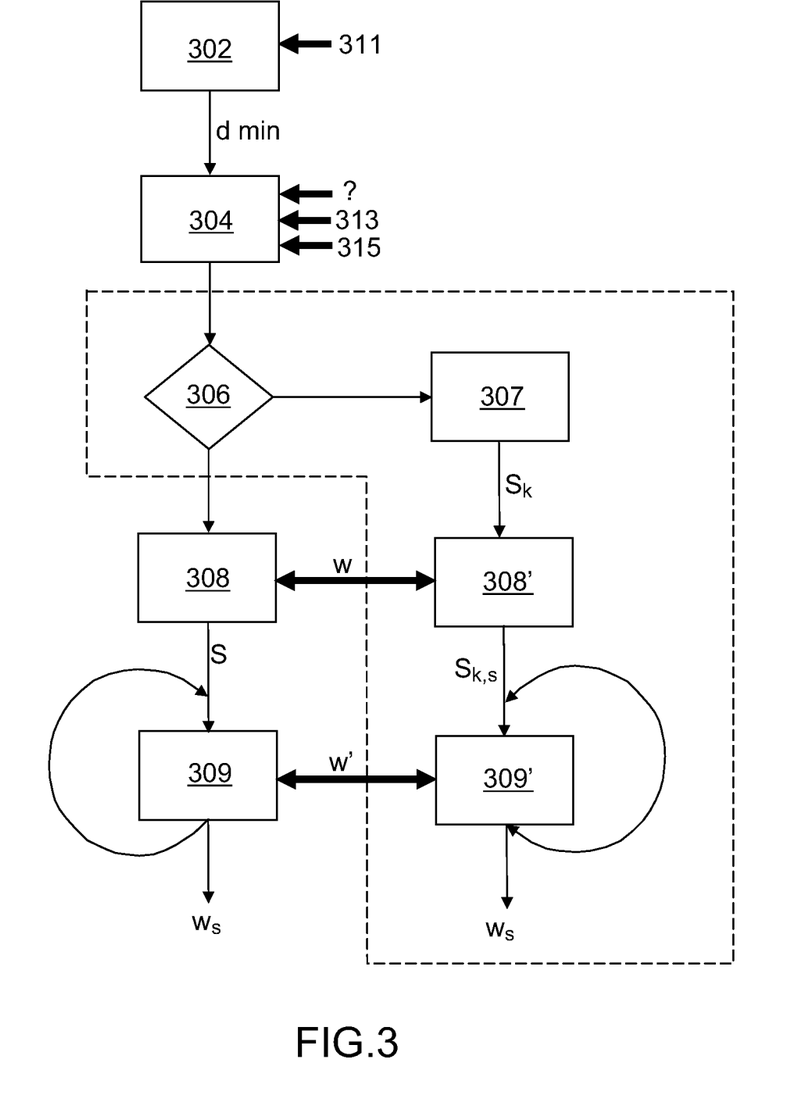
FIG. 3, a schematic illustrating a framework of execution of the method according to the invention.

FIG. 3 illustrates, via a schematic, a framework of execution of the method according to the invention. In practice, during the implementation of the method, the following actions may be performed: having regard to a known noise level 311 at the output of a PUF of an electronic component, for example, the minimum value $d_{min}$ that must be taken by the parameter d of the error correcting code to be used in the "secure sketch" procedure is firstly determined 302. Given, thereafter, the length n of the input datum w to be processed, and the desired levels of security 313 and of effectiveness of the decoding 315 of the code, an error correcting code C is selected 304, for example from a table of known codes. Advantageously, the correcting code selected is that of minimum length satisfying the security criterion.

A test 306 is thereafter performed to determine whether the error correcting code C which has been selected has a length L greater than the length n of the input datum w, because it was not possible to find any correcting code of length L equal to n and satisfying the requirement of minimum correction capacity $d_{min}$. If the test 306 indicates that the length of the selected correcting code C is equal to n, then a conventional enrolment phase 308 and conventional correction phases 309 may be executed without it being necessary to increase the size of the incoming datum w or w'.

On the contrary, if the error correcting code C selected has a length L greater than the length n of the input datum w, then a secret key $S_k$ must be created 307. The size of the secret key $S_k$ is determined so that the length of the extended datum $w_e$ is equal to the length of the code. In this instance, a secret key $S_k$ comprising L-n values is therefore created, and then the enrolment phase 308' and correction phase 309' are executed in compliance with the above-described method according to the invention.

Thus, relative to a conventional scheme, the steps of testing 306, of creation 307 of the secret key $S_k$, of enrolment 308' and of correction 309', surrounded by dashes in FIG. 3, are added.

Figure 4A:
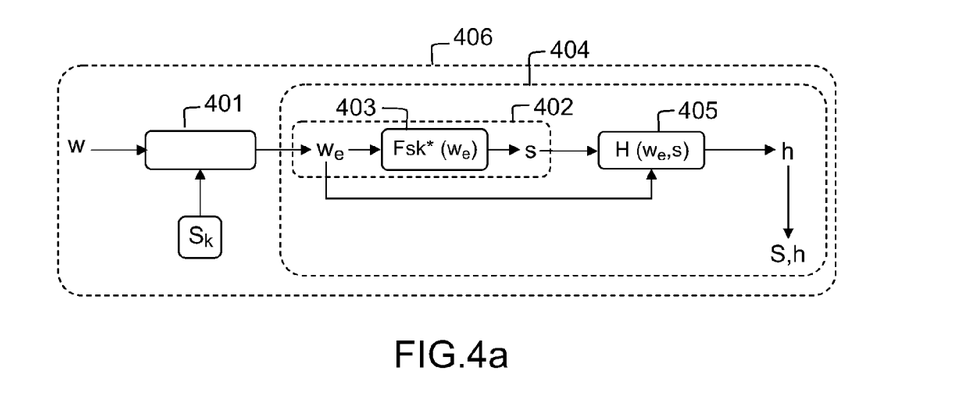
FIG. 4a, a schematic illustrating the steps of a phase of enrolment of a second implementation of the method according to the invention.
Figure 4B:
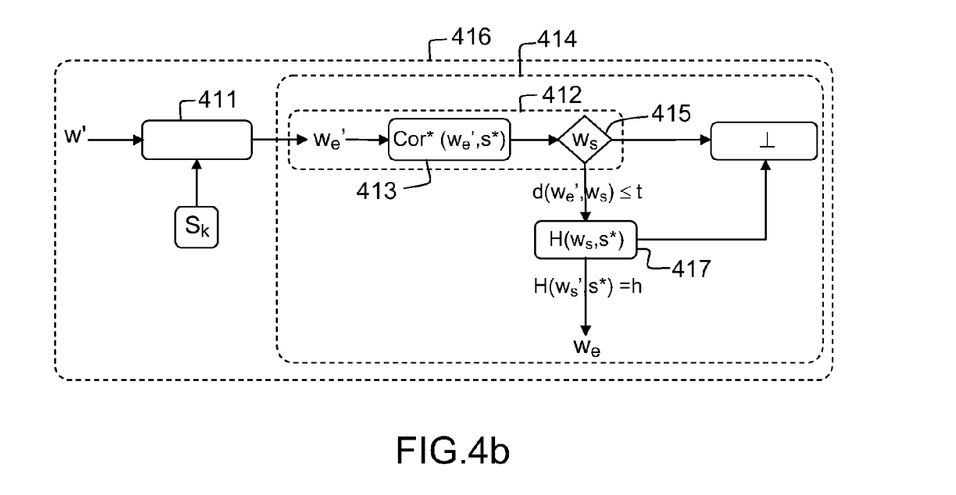
FIG. 4b, a schematic illustrating the steps of a phase of correction of the second implementation of the method according to the invention.

FIGS. 4a and 4b present a second implementation of the method according to the invention showing that the method according to the invention can also be applied to a robust "secure sketch" module, a module presented by Boyen et al in "Secure remote authentication using biometric data", EURO-CRYPT 2005: LNCS, vol. 3494, pages 147-163, Springer. This module has been developed to alleviate the vulnerabilities of fuzzy extractors to an attacker modifying the reconstruction public datum s directly on the storage medium thereof or during transmission thereof to the calculation unit implementing the "secure sketch" correction phase. A fuzzy extractor using a robust "secure sketch" module thus makes it possible to secure an authentication in the presence of an active attacker. They allow a user and the device storing the users' secret data to authenticate one another mutually through a non-secure communication channel. For these security purposes, an authentication layer is added to the public datum s, by virtue of which a user can quit the protocol in the case of falsification.

By judiciously choosing a hash function, it is possible to make each fuzzy extractor into a robust fuzzy extractor. Let w and w' be responses of a PUF of an electronic component, with w' close to w. Let H: $\{0,1\}^* \rightarrow \{0,1\}^p$ be a hash function transforming a datum of arbitrary length into a datum of length p. A robust "secure sketch" module, comprising the enrolment function Fsk and correction function Cor, is constructed on the basis of any standard "secure sketch", comprising the enrolment function Fsk* and correction function Cor*, in the following manner:

i) the enrolment of the reference datum w is performed to obtain a conventional reconstruction datum $s^*$:$s^* \leftarrow Fsk^*(w)$ ii) A hash function is applied to the reconstruction datum $s^*$ and to the reference datum w to obtain a check hashed datum $h = H(w, s^*)$ The data produced by the enrolment are therefore the reconstruction datum $s^*$ and the check hashed datum h.

Advantageously, the hash function H used in the robust "secure sketch" is different from the hash function which is used for the extraction of randomnesses when one wishes to generate a cryptographic key.

Subsequently, the correlation phase uses the check datum h to ensure that the reconstruction datum $s^*$ has not been maliciously modified.

i) A stabilized datum $w_s$ is firstly produced in a conventional manner on the basis of a noisy datum w' and of the reconstruction datum $s^*$.

ii) Thereafter, a test is performed to determine whether the distance separating the stabilized datum $w_s$ obtained from the noisy datum is greater than a threshold (the threshold is the correction capacity of the code used). If such is the case, an error indicator $\perp$ is returned in place of the stabilized datum $w_s$.

iii) Next, a second test is applied to determine whether the application of the hash function H to the stabilized datum $w_s$ and to the reconstruction datum $s^*$ produces a hashed datum identical to the check hashed datum h produced during the enrolment phase. If these hashed data differ from one another, then an error indicator $\perp$ is returned in place of the stabilized datum $w_s$.

FIG. 4a is a schematic illustrating the steps of an enrolment phase executed during this second implementation of the method according to the invention.

The method according to the invention may be combined with a robust "secure sketch" module in such a way as to compound the advantages afforded by each.

Let $S_k$ be a secret key expressed in the form of a double list (V,P). Let f be an expansion function making it possible to increase the size of a datum w to be processed with a key $S_k$. Then, a robust "secure sketch" comprising a security feature such as proposed by the invention may be obtained as follows:

i) Increase, 401, the size of the reference datum w to obtain an extended reference datum $w_e$: $w_e \leftarrow f(w, S_k)$.

ii) Generate, 403, a reconstruction datum $s^*$ on the basis of the extended reference datum $w_e$ with the aid of the standard "secure sketch".

iii) Apply, 405, a hash function H to the extended reference datum $w_e$ and to the reconstruction datum $s^*$ to obtain a check hashed datum $h$:$h = H(w_e, s^*)$ The data produced by the enrolment are therefore the reconstruction datum $s^*$ of increased size and the check hashed datum h which is notably dependent on the extended reference datum $w_e$.

The functional nestings are clearly apparent in FIG. 4a: a standard "secure sketch" enrolment function 402 is nested in an enrolment function of robust "secure sketch" type 404, itself nested by the enrolment method according to the invention 406. The enrolment method according to the invention can therefore readily accommodate an already established architecture.

FIG. 4b is a schematic illustrating the steps of a correction phase executed during the second implementation of the method according to the invention. The correction phase comprising the combined advantages of the robust "secure sketch" and of the method according to the invention is obtained as follows:

i) Perform, 411, on the noisy datum w' a processing analogous to that 401 operated on the reference datum w during the enrolment phase; this noisy datum w' is extended with a key $S_k$.

ii) Produce, 413, a stabilized datum $w_s$ on the basis of the extended noisy datum $w_e'$ and of the reconstruction datum $s^*$.

iii) Thereafter, apply a test 415 to determine whether the distance separating the stabilized datum $w_s$ obtained from the extended noisy datum $w_e'$ is greater than a threshold, this threshold being the correction capacity t of the error correcting code C. If such is the case, an error indicator $\perp$ is returned in place of the stabilized datum $w_s$.

iv) Next, a second test 417 is applied to determine whether the application of the hash function H to the stabilized datum $w_s$ and to the reconstruction datum $s^*$ produces a hashed datum identical to the check hashed datum h produced during the enrolment phase. If these hashed data differ from one another, then an error indicator $\perp$ is returned in place of the stabilized datum $w_s$. In the converse case, the stabilized datum $w_s$, equal to the extended reference datum $w_e$, is produced as output.

Once again, the functional nestings are clearly apparent in FIG. 4b: a standard "secure sketch" correction function 412 is nested in a correction function of robust "secure sketch" type 414, itself nested by the correction method according to the invention 416. The correction method according to the invention can therefore readily accommodate an already established architecture.

Figure 5:
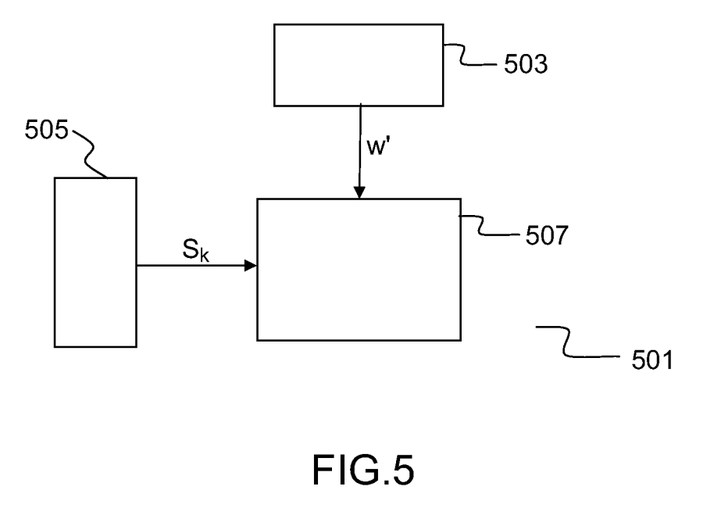
FIG. 5, an exemplary electronic system implementing the method of authentication according to the invention.

FIG. 5 presents an electronic system implementing the method of authentication according to the invention.

The system 501 comprises a biometric sensor 503, a recording medium 505 storing a secret key $S_k$ and a calculation unit 507 implementing the method of authentication according to the invention. The calculation unit 507 is able to receive the secret key $S_k$ arising from the recording medium 505 and a noisy datum w' arising from the biometric sensor 503.

By way of illustration, an individual to be identified generates, via the biometric sensor 503, his own inherent datum w'. The recording medium 505 (for example a USB key, a network disk) is connected to the calculation unit and provides the secret key $S_k$. The calculation unit 507 attempts, on the basis of these two data w', $S_k$, to reconstruct the reference datum w produced during a prior enrolment phase.

Without departing from the scope of the invention, the biometric sensor 503 may be replaced with a PUF, for example a PUF of an electronic component.

The invention claimed is:

1. A method for enrolling a reference datum w having n digits, executed by a calculation unit, said method comprising at least the following steps:
for the enrolling, selecting an error correcting code C of a length L greater than n, the correction capacity of the error correcting code being greater than the expected number of errors between two acquisitions of the reference datum w, the correcting code having a predetermined minimum dimension corresponding to a minimum security level;
generating an extended datum $w_e$ by increasing the size of the reference datum w with L-n digits making up a secret key $S_k$;
randomly choosing a word c of the selected error correcting code C;
combining the said word c with the said extended datum $w_e$, so as to generate a datum s for reconstructing $w_e$;
recording the datum s on a storage medium; and
for reconstructing an extended reference datum $w_e$ having L digits on the basis of a noisy datum w' having n digits, n≤L; and of a reconstruction datum s generated during the enrolling of the reference datum w, the reconstructing comprising:
generating an extended noisy datum $w_e'$ by increasing the size of the noisy datum w' with L-n digits making up the said key $S_k$;
combining the reconstruction datum s with the extended noisy datum $w_e'$ to obtain a word c' of length L;
decoding the word c' as word c" belonging to the code C, and
combining the word c" with the reconstruction datum s to generate a stabilized datum $w_s$ equal to the extended reference datum $w_e$ if the word c" obtained by decoding is identical to the word c.

2. The method of enrolling according to claim 1, wherein the key $S_k$ is defined by a pair of lists, the first list V comprising L-n digits to be inserted into the reference datum w, the second list P comprising for each of the said digits to be inserted its position in the said datum.

3. The method of enrolling according to claim 1, wherein the noisy datum w' is provided by a function related to the physical characteristics specific to an electronic circuit.

4. The method of enrolling according to claim 1, wherein the noisy datum w' is provided by a biometric sensor.

5. A secure method for stabilizing data comprising a step of determining a minimum correction capacity of an error correcting code C to be employed to stabilize the said data as a function of the level of noise by which they are affected, a step of selecting the said error correcting code C from among several available codes, wherein the said selected code C can have a length greater than the length n of the said data, a test being performed to determine whether the said selected code C has a length greater than n, the method comprising a step of creating a key $S_k$ in the case where the said selected code C has a length greater than n, and at least one enrolment method for enrolling a reference datum w according to the method of enrolling according to claim 1, followed by a data correction method being executed to generate a stabilized datum and for reconstructing an extended reference datum $w_e$ having L digits on the basis of a noisy datum w' having n digits, n≤L, and of a reconstruction datum s generated during the enrolment method, the said data correction method further comprising at least the following steps:
generating an extended noisy datum $w_e'$ by increasing the size of the noisy datum w' with L-n digits making up the said key $S_k$;
combining the reconstruction datum s with the extended noisy datum $w_e'$ to obtain a word c' of length L;
decoding the word c' as word c" belonging to the code C;
combining the word c" with the reconstruction datum s to generate a stabilized datum $w_s$ equal to the extended reference datum $w_e$ if the word c" obtained by decoding is identical to the word c.

6. The method of enrolling according to claim 5, wherein at least one of authenticating and generating a cryptographic key comprising a randomness extraction step applied to the stabilized datum $w_s$ generated by the secure method for stabilizing.

7. An electronic authentication system comprising a biometric sensor, said system comprising a recording medium storing a secret key $S_k$, a calculation unit implementing the method according to claim 6, the said calculation unit being able to receive the secret key $S_k$ arising from the said medium and a noisy datum w' arising from the said sensor.

8. The method of enrolling a reference datum w according to claim 1, wherein a check hashed datum h is produced by applying a hash function H to a combination of the extended reference datum $w_e$ with the reconstruction datum s.

9. The method of claim 8 further comprising a data correction method executed by a calculation unit for reconstructing an extended reference datum $w_e$ having L digits on the basis of a noisy datum w' having n digits, n≤L, and of a reconstruction datum s generated during the enrolment of the reference datum w, said data correction method comprising least the following steps:
generating an extended noisy datum $w_e'$ by increasing the size of the noisy datum w' with L-n digits making up the said key $S_k$;
combining the reconstruction datum s with the extended noisy datum $w_e'$ to obtain a word c' of length L;
decoding the word c' as word c" belonging to the code C;
combining the word c" with the reconstruction datum s to generate a stabilized datum $w_s$;
applying the hash function H to a combination of the stabilized datum with the reconstruction datum s to produce a hashed datum $h_s$;
comparing the check hashed datum h, obtained during the enrolment, with the hashed datum $h_s$;
producing a value ⊥ indicating an error if the data h and $h_s$ are different.

* * * * *